(12) United States Patent
Sallee et al.

(10) Patent No.: US 12,051,172 B2
(45) Date of Patent: Jul. 30, 2024

(54) VIIRS IMAGE PROCESSING

(71) Applicant: Raytheon Company, Tewksbury, MA (US)

(72) Inventors: Philip A. Sallee, South Riding, VA (US); Stephen J. Raif, Sachse, TX (US); Nicole A. Haffke, La Vista, NE (US)

(73) Assignee: Raytheon Company, Tewksbury, MA (US)

( * ) Notice: Subject to any disclaimer, the term of this patent is extended or adjusted under 35 U.S.C. 154(b) by 358 days.

(21) Appl. No.: 17/519,946

(22) Filed: Nov. 5, 2021

(65) Prior Publication Data

US 2023/0146360 A1      May 11, 2023

(51) Int. Cl.
*G06T 3/4007* (2024.01)
(52) U.S. Cl.
CPC .................................. *G06T 3/4007* (2013.01)
(58) Field of Classification Search
CPC .................................................. G06T 3/4007
See application file for complete search history.

(56) References Cited

U.S. PATENT DOCUMENTS 9,990,753 B1 *   6/2018   Cai .................... G06V 10/443

OTHER PUBLICATIONS

Miller et al., GeoColor: A Blending Technique for Satellite Imagery, Journal of Atmospheric and Oceanic Technology, vol. 37, issue 3, p. 429-448 (2020) (Year: 2020).*
Polivka et al., Improving Nocturnal Fire Detection With the VIIRS Day-Night Band, IEEE Transactions on Geoscience and Remote Sensing (vol. 54, Issue: 9, pp. 5503-5519) (Year: 2016).*
Cao et al., Progress in the Calibration/Validation of VIIRS on Suomi NPP and J1, 2016 IEEE International Geoscience and Remote Sensing Symposium, p. 2937-2940 (IGARSS) (Year: 2016).*
Gladkova et al., Improved VIIRS and MODIS SST Imagery, Remote Sens. 2016, 8, 79 (Year: 2016).*

* cited by examiner

*Primary Examiner* — Vu Le
*Assistant Examiner* — Lei Zhao
(74) *Attorney, Agent, or Firm* — Schwegman Lundberg & Woessner, P.A.

(57) ABSTRACT

Systems and methods for VIIRS image processing. The method can include receiving image data of immediately adjacent VIIRS image scans including a first image scan and a second image scan. The first image scan and the second image scan provide a partially overlapping view of a geographic area. The method can further involve resampling columns of pixels of the first image scan and the second image scan. The resampling can include selecting, in the first image scan and the second image scan, a subset of pixel values in each column that correspond to a specified geographic distance. The method can further involve upsampling the selected pixels to an equal number of pixels in each column resulting in upsampled pixel values and interpolating the upsampled pixel values to produce modified first and second image scans.

20 Claims, 11 Drawing Sheets

VIIRS IMAGE PROCESSING

TECHNICAL FIELD

Embodiments discussed herein regard devices, systems, and methods for visible infrared imaging radiometer suite (VIIRS) image processing.

BACKGROUND

VIIRS data is available to the public in the form of Sensor Data Records (SDRs). These SDRs have undergone some pixel calibration processing from raw data (Raw Data Records) but do not have "bow-tie" effects removed. A limited number of SDR files are processed and mapped to a "ground-track Mercator" projection and, thus, converted to Imagery Environmental Data Records (EDRs). Imagery EDR processing is a relatively slow process and includes collecting multiple SDRs (sensor sweeps grouped into "granules") and separate geospatial files that correspond to each SDR then re-interpolating the data into a rectangular geo-spatial footprint for each Imagery EDR product output. Current Imagery EDR processing cannot run on single SDRs and is not well suited for insertion into a data processing pipeline before application of machine learning (ML) models. A more common solution based on open-source software is the Python SatPy package, which has a reader for VIIRS. However, the re-interpolation performed by SatPy has significant limitations in quality, speed, and utility that are addressed by embodiments.

DETAILED DESCRIPTION

Figure 1:
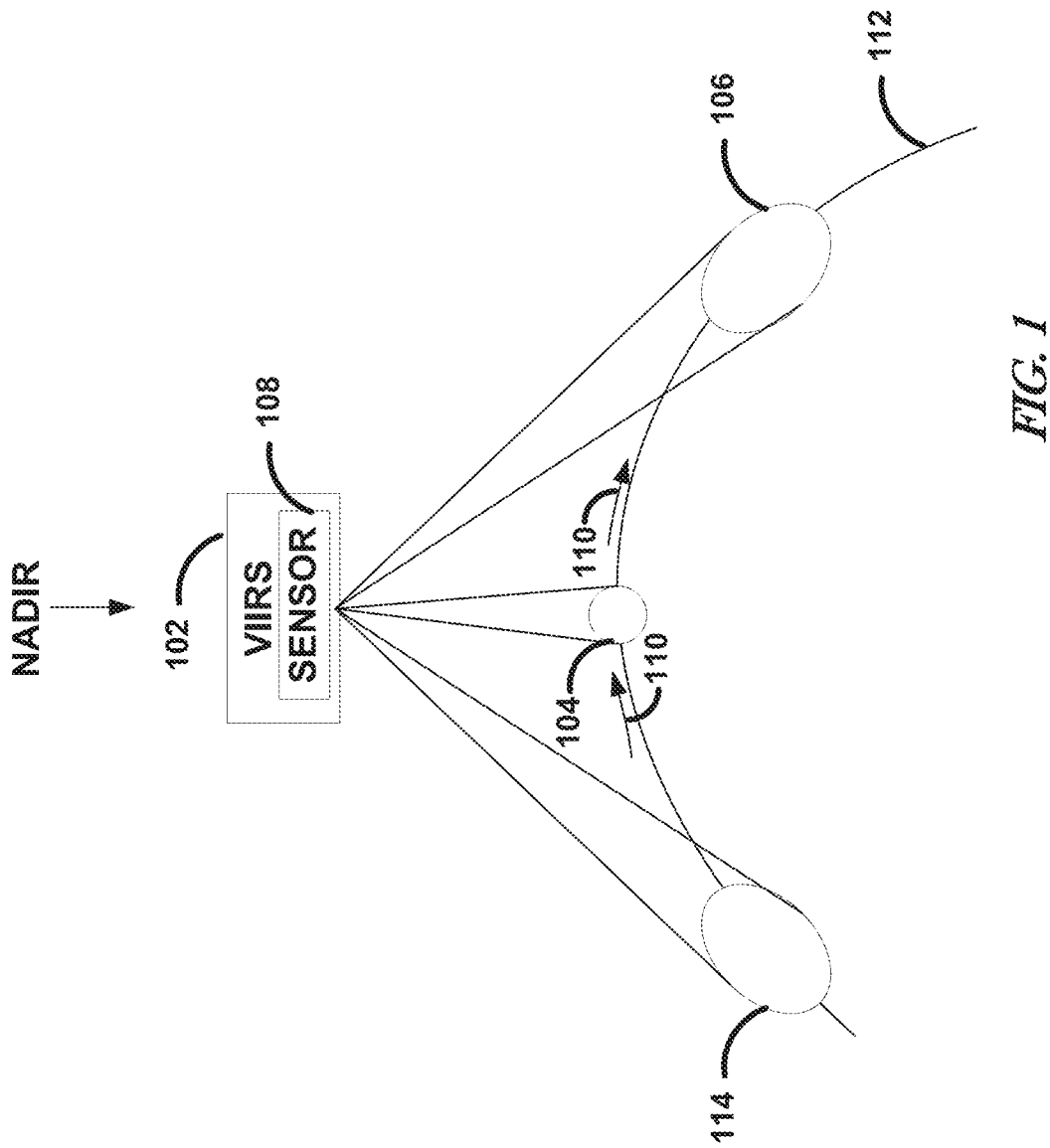
FIG. 1 illustrates, by way of example, a block diagram of an embodiment of a VIIRS device performing an image scan.

A VIIRS image is sometimes called a "granule". Each granule is a collection of 48 VIIRS image scans. An SDR can include data of one or more granules. Each of the image scans can include of height 16 rows for 750-meter moderate resolution imaging spectroradiometer "M-bands", and height 32 rows for 375-meter resolution (so called I-bands). In other words, each column of the M-band can include 16 pixels (rows) of data values per scan.

VIIRS satellite imagery can be processed to remove striping or banding artifacts that is produced due to curvature of the Earth. The curvature of the Earth, along with a characteristic of the aperture of the VIIRS sensor causes a "bow-tie" effect. The VIIRS sensor has a unique sample aggregation scheme which varies across a frame. VIIRS images are formed from multiple scans, using a rotating mirror, which produces strips of data. The strips of data can be interleaved or stitched together, with gaps formed by dropping pixels in redundantly sampled areas. These artifacts cause spatial discontinuities that can be removed by pixel reordering and interpolation before applying computer vision ML models to the imagery. This processing of the VIIRS imagery can benefit from streamlining. The streamlining can improve the speed and quality of a final rendered image, such as to integrate the imagery into a higher-throughput data processing pipeline. ML classification of VIIRS imagery can support identification of storms, create cloud cover/cloud type masks, and for other weather and defense related applications, but VIIRS artifacts may interfere with image features and reduce the accuracy of these ML models. Some of the artifacts can lead to an edge detector technique detecting an artifact in the imagery as an edge, thus making the ML technique less reliable.

Although SatPy fills in missing pixels between strips of data, the SatPy technique requires pairing each SDR with a corresponding geolocation (GEO) file, runs significantly slow (on the order of minutes for a single image), does not adequately correct all of the missing pixels on the image border, incorrectly scales the color data, forces reduction of precision to 8-bit, and does not correct spatial discontinuities between each band. Embodiments advance the operation of SatPy by improving upon one or more of the deficiencies of SatPy discussed above. The GEO file includes geodetic longitude, latitude, satellite zenith and azimuth angles, range to the satellite, solar zenith and azimuth angles, and (for night band) lunar zenith and azimuth angles.

Embodiments provide systems, devices, and methods for rapidly processing VIIRS SDRs, such as on a per-file basis. Embodiments do not require pairing the SDR with geospatial information (a GEO file) as embodiments can rely only on sensor sampling characteristics. Embodiments can correct spatial discontinuities. The spatial discontinuity correction can be performed by selecting pixels and effectively rescaling columns within each strip (e.g., sensor sweep/row) based on an estimated function of the relative ground distance, determined according to the sensor aggregation pattern and off-nadir angle. Embodiments can use matrix multiplication to perform fast, pixel-wise interpolation for rescaling operations. An output of embodiments can be of the same size and dimension as an original SDR image for each band, facilitating insertion into data flow pipelines. Embodiments can process a single 5-band SDR in about 20 seconds on a graphics processing unit (GPU)-enabled compute device. Embodiments can provide effective removal of spatial discontinuities with high visual quality. SatPy processes the same file in over 3 minutes, with the same GPU-enabled compute device, with visibly inferior results that do not remove spatial discontinuities. Such spatial discontinuities may reduce the effectiveness of ML applications to identify and extract image features.

Some aspects of embodiments can be provided by one or more of 1) fitting a piece-wise function (piece-wise linear, piece-wise polynomial, or the like) to estimate a relative ground distance (along the width of the strip formed by a mirror sweep) at each point along the imaged strip formed by the sensor (for each sampled off-nadir angle), or 2) applying an interpolant function, formed as a matrix, to the image data for each off-nadir angle column by first reshaping the image data and then applying a matrix multiplication. The proposed embodiments for processing VIIRS SDRs can be performed independent of geospatial metadata (GEO file) which is generally transmitted separately. Embodiments can be performed without interpolation to geospatial coordinates, which is computationally expensive in terms or processor and memory bandwidth required.

FIG. 1 illustrates, by way of example, a block diagram of an embodiment of a VIIRS device 102 performing an image scan. The VIIRS device 102 (e.g., via an articulating mirror) moves a mirror that is part of an imaging sensor 108. The articulation can sweep the field of view of the sensor 108. In the example of FIG. 1, the articulation direction is indicated by arrows 110. Typically, a scan from the sensor 108 spans about equal extent to the left as it does to the right, forming a full bow-tie looking scan.

The sensor 108 can image a slice corresponding to the arrows 110. Due to the curvature of Earth 112 or other celestial object, a geographic area 104 imaged closer to nadir is smaller than a geographic area 106. 114 imaged further from nadir. The sensor 108 generates image data that does not compensate for this discrepancy in geographic area imaged. Thus, pixels closer to nadir (e.g., pixels of image data in the geographic region 104) span less geographic area than pixels further from nadir (e.g., pixels of image data in the geographic region 106). This discrepancy in spanned geographic area creates a so-called "bow-tie" effect in the generated image.

Figure 2:
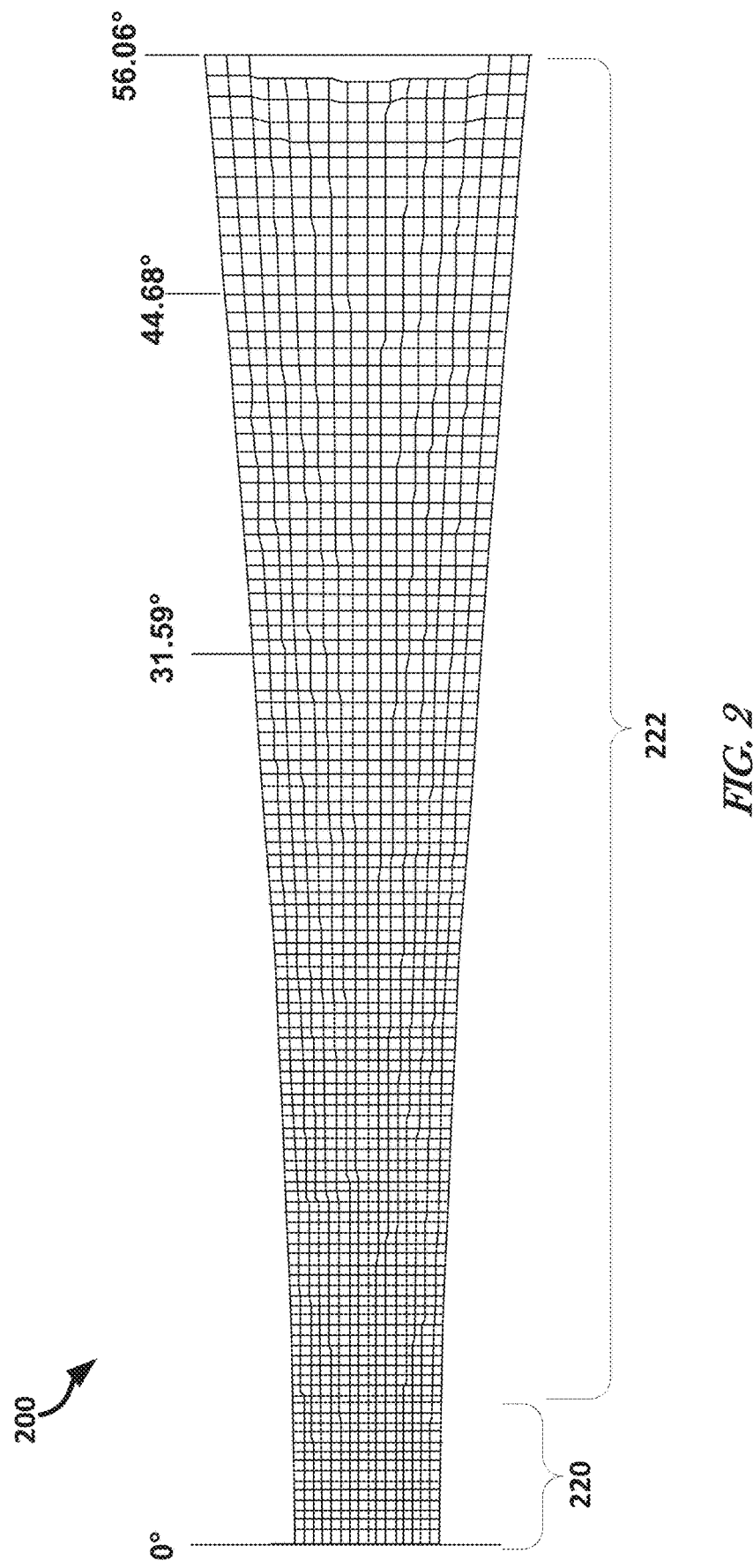
FIG. 2 illustrates, by way of example, an example of an image pixel grid with pixel extent registered to surface of the Earth.

FIG. 2 illustrates, by way of example, an example of an image pixel grid 200 with pixel extent registered to surface of the Earth. The pixel grid 200 spans more geographic area further away from nadir (0°). This expands the pixel grid 200 to form a shape reminiscent of a "bow-tie". Only half (the right-hand side) of the bow tie is illustrated in FIG. 2. Typically, a scan from the sensor 108 spans about equal extent to the left as it does to the right, forming a full bow-tie looking scan.

When the pixel grid 200 is stitched together with a second pixel grid (see FIG. 3) immediately above or below (displayed contiguous with) the one illustrated, the nadir, and near-nadir pixels 220 of the pixel grid 200 will not overlap with the second pixel grid. Pixels 222 further from nadir will overlap with corresponding pixels of the second pixel grid. The further the pixels 222 are from nadir, the more the overlap between immediately adjacent images.

Figure 3:
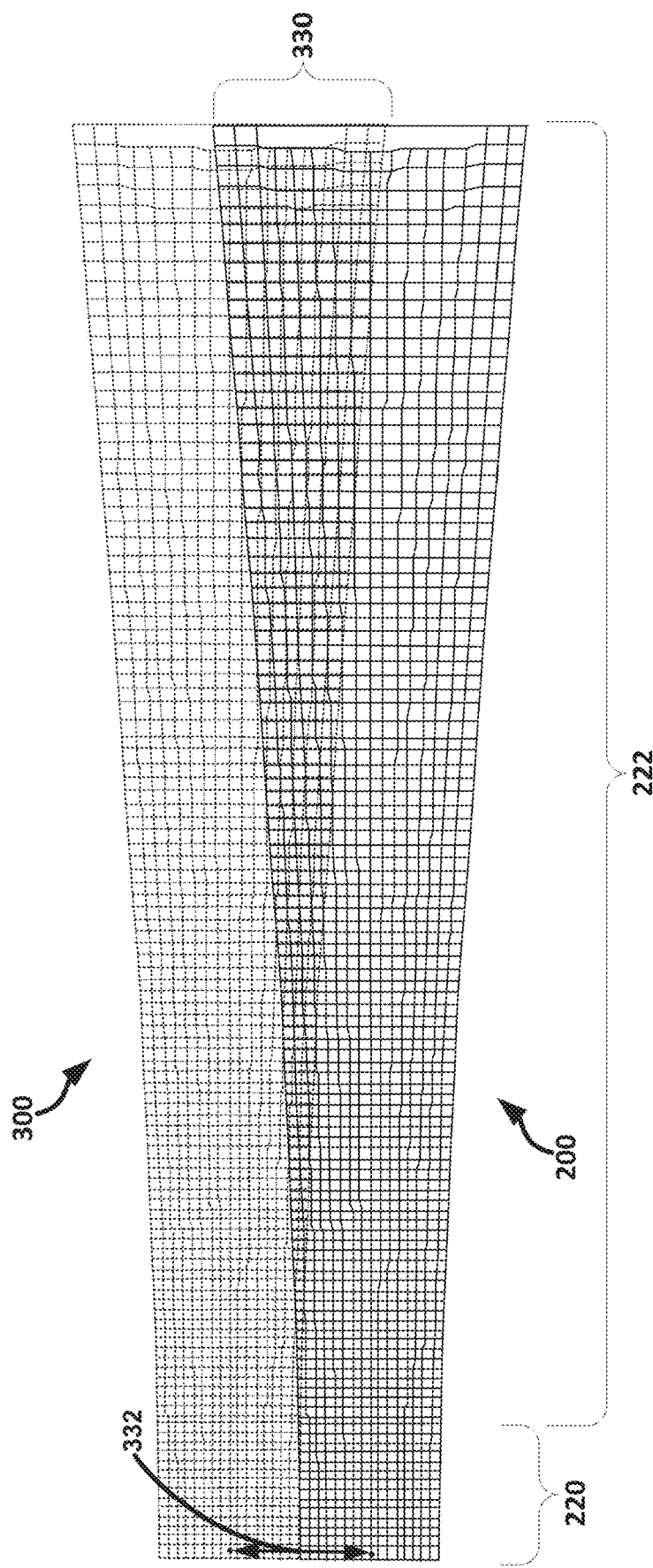
FIG. 3 illustrates, by way of example, a block diagram of an embodiment of naively stitching together immediately adjacent images of pixel grids.

FIG. 3 illustrates, by way of example, a block diagram of an embodiment of immediately adjacent images of pixel grids 200 and 300 stitched together. The pixel grids 200, 300 are illustrated to include pixel dimensions corresponding to their geographical extent, thus the overlap is in geographical extent covered by the pixels. The pixel grid 300 is illustrated in dashed lines, while the pixel grid 200 is illustrated in solid lines. As can be seen, geographic overlap 330 increases further away from nadir. VIIRS image processors, such as one that implements the method 400 and SatPy, handle the variation in geographic extent of the pixels of the pixel grids 200 and 300 and the geographic overlap in different ways. Embodiments can adjust the images corresponding to the pixel grids 200, 300 using a technique illustrated in FIG. 4.

Pixel values of overlapping pixels in the pixel grid 300 that correspond to pixels selected and retained in the pixel grid 200 are not retained in the pixel grid 300 and vice versa.

Embodiments can select pixels, in the first image scan 200 and the second image scan 300, that are a subset of pixel values in each column and that correspond to a geographic distance between (i) a point viewed in a center of a column in the first image scan and (ii) a point viewed in a center of a corresponding column in the second image scan. Line 332 represents that geographic distance.

Figure 4:
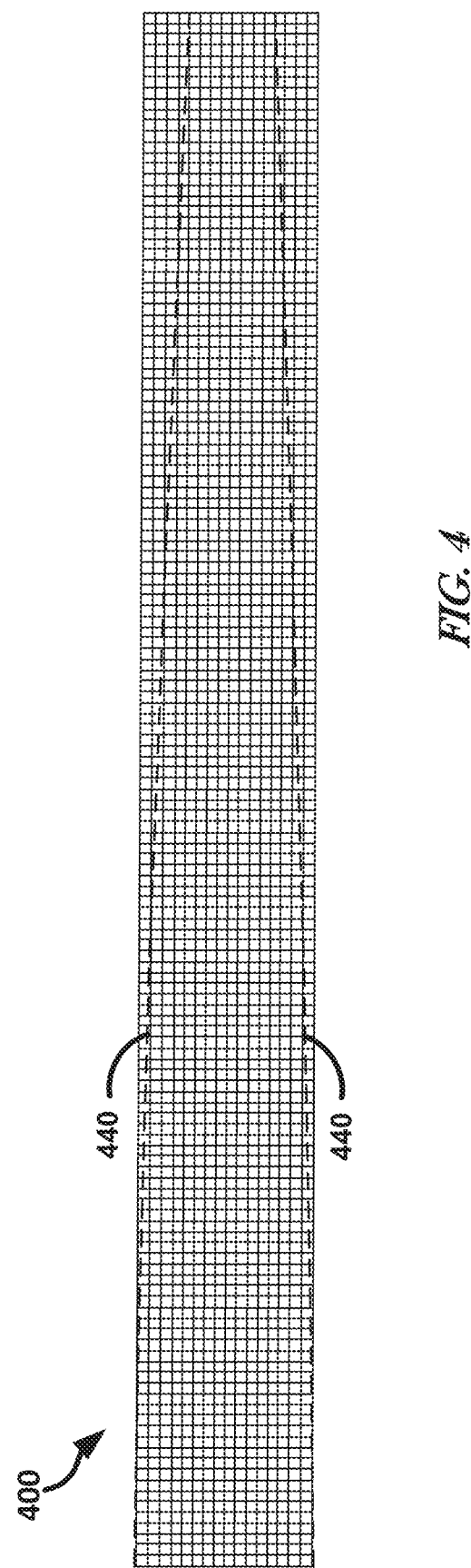
FIG. 4 illustrates, by way of example, a diagram of an embodiment of a technique for VIIRS image processing.

FIG. 4 illustrates, by way of example, a block diagram of a pixel grid 400 that is the pixel grid 200 without pixel dimensions adjusted according to geographic extent covered by the pixels. The pixel grid 400 includes dashed lines 440 that indicate a boundary between selected and unselected pixels. The pixels within the dashed line 440 are selected, while pixels outside the dashed line 440 or that include a part of the dashed line therethrough, are unselected (see FIG. 5, among others, for more details regarding pixel selection).

Figure 5:
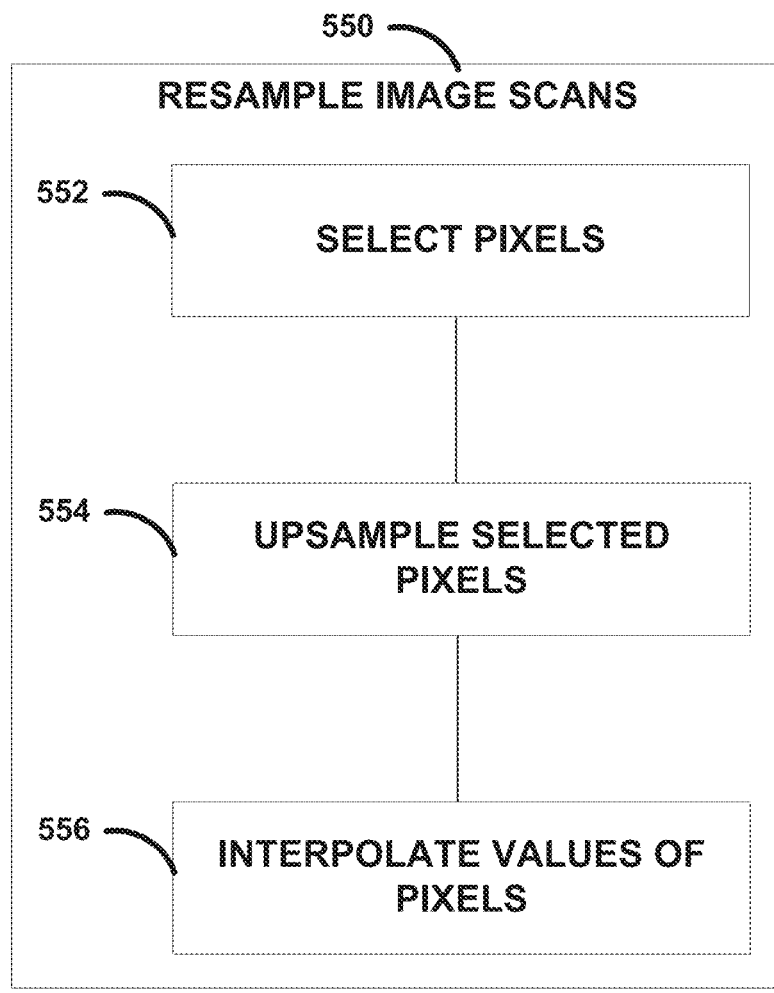
FIG. 5 illustrates, by way of example, a diagram of an embodiment of aggregating pixels per distance from nadir.

FIG. 5 illustrates, by way of example, a diagram of an embodiment of a resampling operation 550 for VIIRS image processing. The operation 550 can include selecting pixels of each of the image scans, at operation 552; upsampling selected pixels resulting in upsampled pixels, at operation 554; and interpolating values of the upsampled pixels, at operation 556. The pixel values selected at operation 552 can include selecting, in each image scan, a subset of pixel values in each column that correspond to a geographic distance between (i) a point viewed in a center of a column in the first image scan and (ii) a point viewed in a center of a corresponding column in the second image scan. The operation 554 can include upsampling the selected pixels to an equal number of pixels in each column resulting in upsampled pixel values. Pixel values that are not selected at operation 552 (sometimes called unselected pixels) are not considered in upsampling. Interpolating the upsampled pixel values at operation 556 produces modified first and second image scans by replacing pixels with a re-sample result. The geographic distance can be a geographic distance viewed in a column of pixels of the first image scan corresponding to nadir.

The operation 552 can include selecting fewer pixels from columns further away from a column of pixels of the first image scan corresponding to nadir than in a column of the first image scan closer to nadir. The operation 552 can include selecting all pixels in the column of the first image scan corresponding to nadir. The operation 552 can include selecting pixel values based on a function that approximates a number of pixels to be selected as a function of a distance, in terms of number of columns of pixels, from nadir. The function can be a fit, piecewise polynomial estimate (e.g., linear, quadratic, exponential, or the like) estimate, or the like of a line representing a number of pixel value to be removed in a column of pixels as a function of distance the column of pixels is from a center column (a column corresponding to nadir).

Results of the operation 550 can be provided on a display. The results can include situating, on the display, the modified first image scan contiguous with the second image scan, the modified first and second image scans providing a view that comports with actual geo-spatial orientation and shape of objects in the first and second image scans. Results of the operation 550 can include providing an image comprising the modified first image scan and the modified second image scan contiguous with each other to a machine learning (ML) model.

The operation 556 can include upsampling the first and second image scans and interpolating the upsampled pixel values using a matrix interpolant per column. A matrix interpolant used on a specific column of a first image scan can be the same matrix interpolant used on a corresponding column of the second image scan. To perform resampling of image scans efficiently, columns of pixel data from each image scan can be aggregated by distance from nadir.

Figure 6:
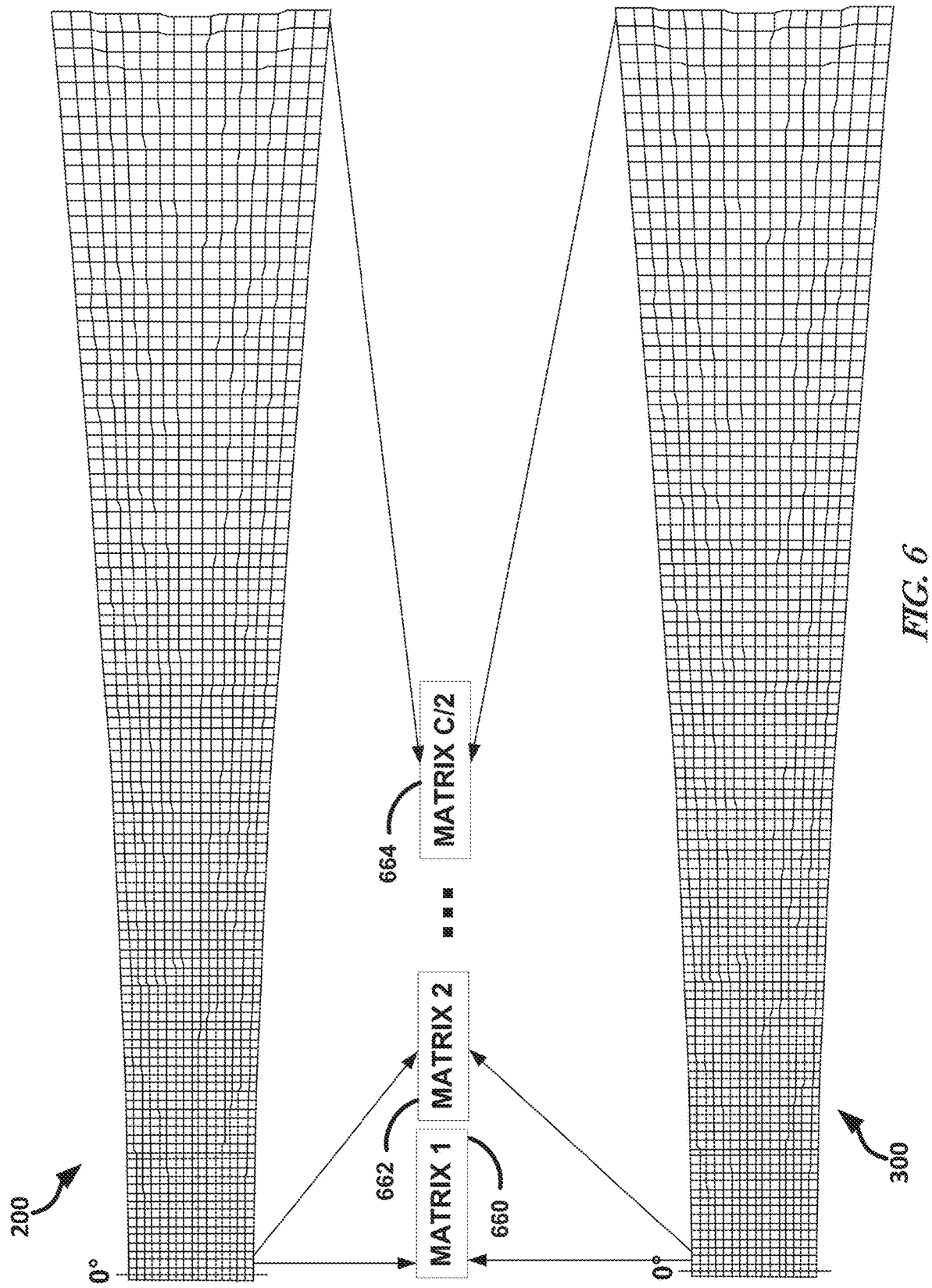
FIG. 6 illustrates, by way of example, a block diagram of an embodiment of a portion of the operation of FIG. 4.

FIG. 6 illustrates, by way of example, a diagram of an embodiment of aggregating pixels per distance from nadir. Note that FIG. 6 illustrates only half of the columns that are aggregated into each matrix 660, 662, 664. Columns a same distance from nadir and to the left of nadir can be included in corresponding matrices 660, 662, 664. A first matrix 660 includes pixel data of columns one column from nadir, a second matrix 662 includes pixel data of columns two columns from nadir, and so on until matrix C/2 664 which includes pixel data of columns that are furthest from nadir.

Figure 7:
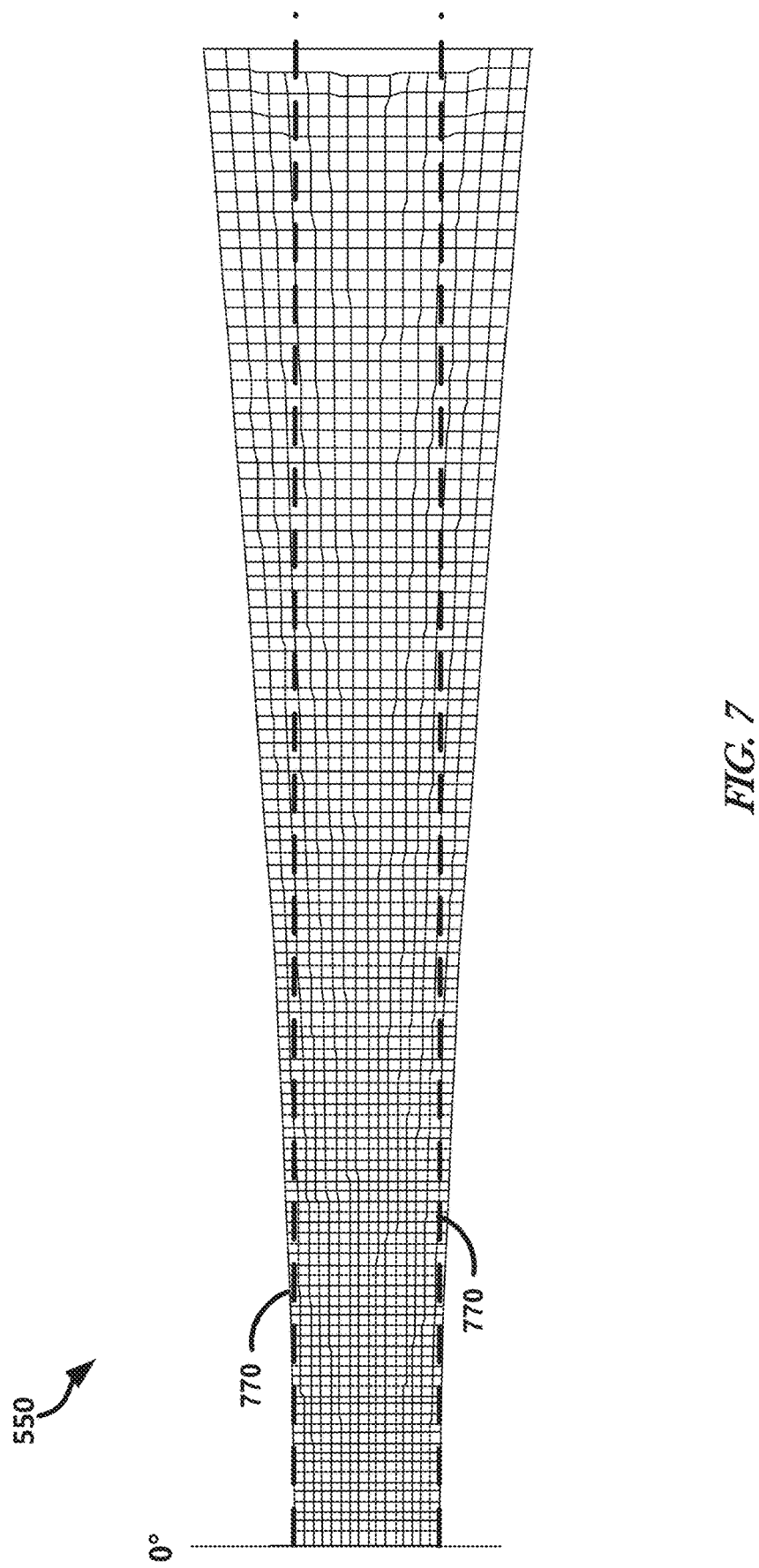
FIG. 7 illustrates, by way of example, a block diagram of an embodiment of a portion of a resampling operation of FIG. 4.

FIG. 7 illustrates, by way of example, a block diagram of an embodiment of a portion of a resampling operation 550. The operation 550 can include selecting a specified number of pixels per column of the pixel grids 200, 300, sometimes called "image scans". The number of pixels in a given column of the pixel grids 200, 300 that are selected can increase based on a distance (e.g., in terms of number of pixels) from nadir. Dashed lines 770 indicate the bounds for the pixels that are selected. Pixels within the dashed lines 770 are selected and pixels outside the dashed lines 770 are not selected. Pixels through which the dashed lines 770 travel can be either selected or not selected.

All pixels at or near nadir can be selected. More pixels can be unselected the further a corresponding column is from nadir. In the example illustrated, 8 or more pixels are selected from columns furthest away from nadir. The selected pixels show content that is present in a different scan and also includes pixels dropped by VIIRS, such as to reduce bandwidth. VIIRS replaces these dropped pixels with unsensed fill values. These unsensed fill values can be unselected.

The number of pixels not selected in a given column can be consistent between image scans. This is, at least in part, because the operation of the VIIRS device 102 is consistent. The aperture does not change, the offset between scans does not change, etc. The number of pixels to be not selected from a given column of an image scan can thus be represented by a piecewise linear function. Other representations can be used to approximate the number of pixels to be removed. The pixels selected (between the dashed lines 770) represent a modified image scan. This image scan is further modified by the operation 550 to generate a processed image scan.

Figure 8:
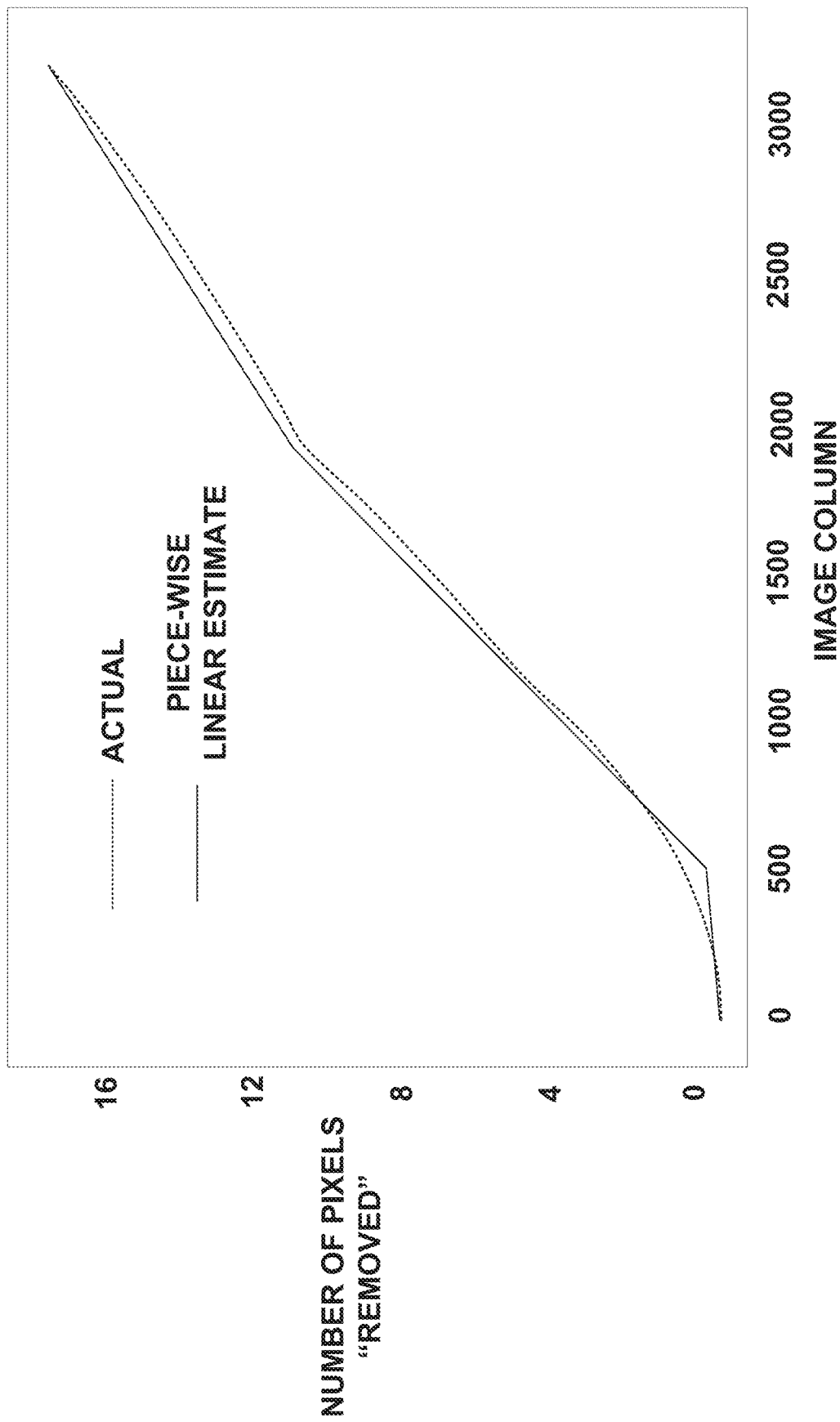
FIG. 8 illustrates by way of example, a graph of number of pixels removed per image column.

FIG. 8 illustrates by way of example, a graph of number of pixels not selected per image column. The image column in FIG. 8 goes from nadir (0) then moves right as the column number increases. For an image with a full bow-tie, the graph is symmetric and can be used for the left-hand side as well. Note the graph of FIG. 8 is for an I-band scan. An M-band scan includes 16 rows per scan and spans half as many pixel columns as the I-band scan. Scaling the graph accordingly provides a graph applicable to an M-band scan.

The operation 550 can include changing pixel value of pixels in columns with fewer pixels than a number of pixels at a column of pixels corresponding to nadir. The number of pixel values changed in each column can be equal to the number of unselected pixels in the column.

The operation 550 can include determining a color for a pixel, such as by interpolation. The operations 550, in some embodiments, can be performed in a single matrix multiplication per column. There are many types of interpolation that can be used to fit desires of a user. The operation 550 can include interpolation of pixel values. Interpolation techniques include nearest neighbor, bicubic, bilinear, spline, or other interpolation. An image scan resulting from interpolating pixel data of a modified image scan is called a processed image scan.

Figure 9:
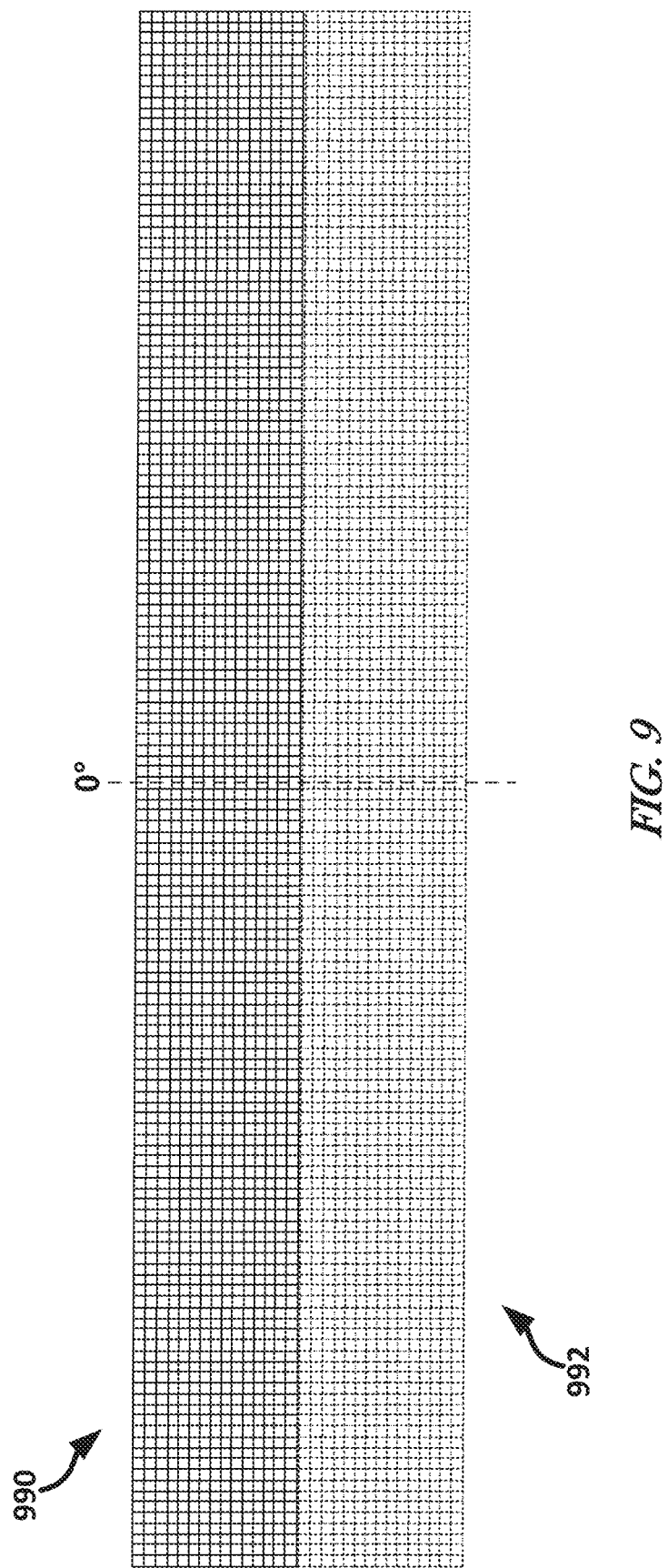
FIG. 9 illustrates, by way of example, a diagram of an embodiment of processed image scans situated contiguous with one another on a display.

FIG. 9 illustrates, by way of example, a diagram of an embodiment of processed image scans 990, 992 situated contiguous with one another on a display. The processed image scans 990, 992 are produced by performing operation 550 on each of the image scans 200, 300.

In summary, a technique for efficiently removing artifacts from a granule can include re-sampling image scans of the granule by:

For each column up to nadir (half the width of SDR array: 3200/2=1600 for M-band VIIRS and 6400/2=3200 for 1-band):

(a) Aggregate corresponding column(s) of pixels from each scan with a specified column distance from nadir into an H-by-N matrix X where H is the scan height and N is the number of scans*2. (There are two column vectors within each scan at that column distance, right and left of nadir).

(b) For the specified column distance, compute a row overlap offset based on the piecewise linear, or other function used to estimate scan overlap for the given column. These offsets/function can be estimated once using a GEO file during a calibration step, and reused across all VIIRS products, or obtained from lookup table, or calculated based on measured characteristics of the sensor.

(c) Use the row overlap for this column to create a linear interpolant matrix M of size (H×H) which upsamples and interpolates selected pixels from each row (vertically center portion of each column vector) to the full height. The output pixels for the respective column from each row can be computed as $\hat{X}=X*M$. Alternatively, another type of interpolant (non-linear) could be used in place of the blockwise linear matrix interpolant. Such as, bicubic or spline interpolation. Other interpolants may be slower but provide more accuracy. Alternatively, overlapping pixels may also be used in the interpolation process to provide more accurate result, at a cost of more computational complexity.

Figure 10:
FIG. 10 illustrates, by way of example, an image produced using embodiments, such as the technique of FIG. 4.

FIG. 10 illustrates, by way of example, a cropped region from an image produced using embodiments, such as performing the operation 550 on the image scan. The cropped region of FIG. 10 does not include the artifacts that are produced from other VIIRS image processing techniques. The image of FIG. 10 was produced in less than one minute (about 20 seconds). An image that includes the cropped region in FIG. 10 is suitable for processing using ML techniques as it does not include additional discontinuities that can be confused as features.

Figure 11:
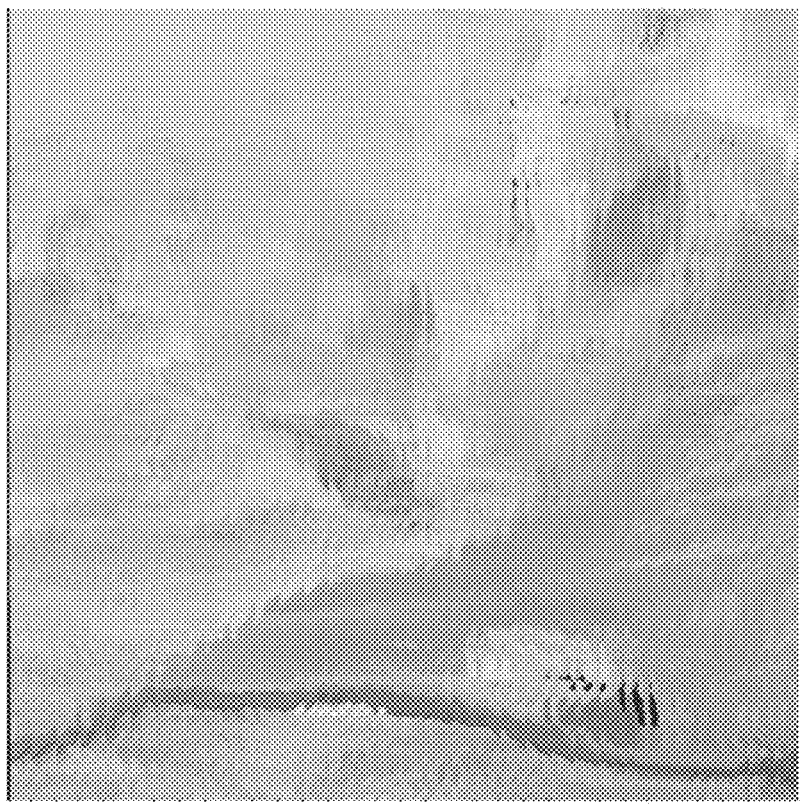
FIG. 11 illustrates, by way of example, an image produced using a SatPy technique.

FIG. 11 illustrates, by way of example, a cropped region from an image produced using a SatPy technique. The cropped region illustrated in FIG. 11 includes a number of artifacts that present themselves as visible discontinuities in the features of the image. The image of FIG. 11 was produced in about 3 minutes. An image as in FIG. 11 is not suitable for processing using ML techniques as it includes additional discontinuities that can be confused as edges or other features.

Figure 12:
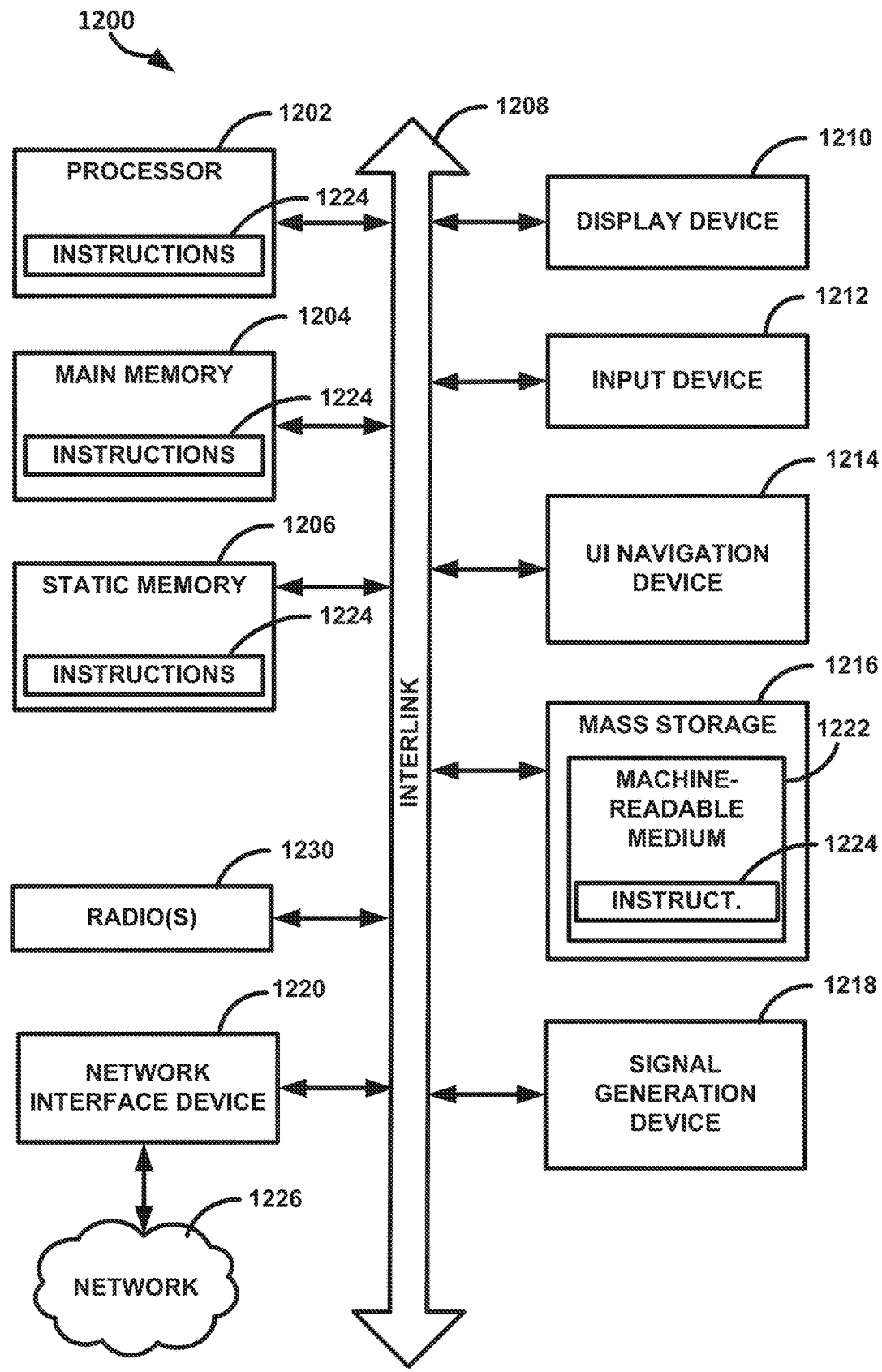
FIG. 12 illustrates, by way of example, a block diagram of an embodiment of a machine in the example form of a computer system within which instructions, for causing the machine to perform any one or more of the methodologies discussed herein, may be executed.

FIG. 12 illustrates, by way of example, a block diagram of an embodiment of a machine in the example form of a computer system 1200 within which instructions, for causing the machine to perform any one or more of the methodologies or operations, such as operation 550, discussed herein, may be executed. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation device 1214 (e.g., a mouse), a mass storage unit 1216, a signal generation device 1218 (e.g., a speaker), a network interface device 1220, and a radio 1230 such as Bluetooth, WWAN, WLAN, and NFC, permitting the application of security controls on such protocols.

The mass storage unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

ADDITIONAL NOTES AND EXAMPLES

Example 1 includes a method for processing visible infrared imaging radiometer suite (VIIRS) scans, the method comprising receiving image data of immediately adjacent VIIRS image scans including a first image scan and a second image scan, the first image scan and the second image scan providing a partially overlapping view of a geographic area, resampling columns of pixels of the first image scan and the second image scan including selecting, in the first image scan and the second image scan, a subset of pixel values in each column that correspond to a geographic distance between (i) a point viewed in a center of a column in the first image scan and (ii) a point viewed in a center of a corresponding column in the second image scan, upsampling the selected pixels to an equal number of pixels in each column resulting in upsampled pixel values, and interpolating the upsampled pixel values to produce modified first and second image scans.

In Example 2, Example 1 can further include, wherein the geographic distance is a geographic distance viewed in a column of pixels of the first image scan corresponding to nadir.

In Example 3, at least one of Examples 1-2 can further include, wherein selecting a subset of pixel values in each column that correspond to the geographic distance includes selecting fewer pixels from columns further away from a column of pixels of the first image scan corresponding to nadir than in a column of the first image scan closer to nadir.

In Example 4, Example 3 can further include, wherein selecting the subset of pixel values in each column includes selecting all pixels in the column of the first image scan corresponding to nadir.

In Example 5, at least one of Examples 3-4 can further include, wherein selecting the subset of pixel values in each column includes selecting pixel values based on a polynomial that approximates a number of pixels to be selected as a function of a distance, in terms of number of columns of pixels, from nadir.

In Example 6, Example 5 can further include, wherein the polynomial is a piecewise polynomial.

In Example 7, at least one of Examples 1-6 can further include situating, on a display, the modified first image scan contiguous with the second image scan, the modified first and second image scans providing a view that comports with actual geo-spatial orientation and shape of objects in the first and second image scans.

In Example 8, at least on of Examples 1-7 can further include providing an image comprising the modified first image scan and the modified second image scan contiguous with each other to a machine learning (ML) model.

In Example 9, at least one of Examples 1-8 can further include, wherein upsampling the first and second image scans and interpolating the upsampled pixel values includes using a matrix interpolant per column such that a matrix interpolant used on a specific column of a first image scan as the matrix interpolant as a corresponding column of the second image scan.

Example 10 includes a non-transitory machine-readable medium including instructions that, when executed by a machine, cause the machine to perform the method of one of Examples 1-9.

Example 11 includes a system comprising processing circuitry, and a memory coupled to the processing circuitry, the memory including instructions that, when executed by the processing circuitry, cause the processing circuitry to perform operations for processing visible infrared imaging radiometer suite (VIIRS) scans, the operations comprising the method of one of Examples 1-6 or 9.

In Example 12, Example 11 can further include a display device coupled to the processing circuitry, and the operations further comprise causing the display device to provide a view of the modified first image scan contiguous with the second image scan, the modified first and second image scans providing a view that comports with actual geo-spatial orientation and shape of objects in the first and second image scans.

In Example 13, Example 11 can further include, wherein the operations further comprise, providing an image comprising the modified first image scan and the modified second image scan contiguous with each other to a machine learning (ML) model.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for processing visible infrared imaging radiometer suite (VIIRS) scans, the method comprising:
receiving image data of immediately adjacent VIIRS image scans including a first image scan and a second image scan, the first image scan and the second image scan providing a partially overlapping view of a geographic area;
resampling columns of pixels of the first image scan and the second image scan including:
selecting, in the first image scan and the second image scan, a subset of pixel values in each column that correspond to a geographic distance between (i) a point viewed in a center of a column in the first image scan and (ii) a point viewed in a center of a corresponding column in the second image scan;
upsampling the selected pixels to an equal number of pixels in each column resulting in upsampled pixel values; and
interpolating the upsampled pixel values to produce modified first and second image scans.

2. The method of claim 1, wherein the geographic distance is a geographic distance viewed in a column of pixels of the first image scan corresponding to nadir.

3. The method of claim 1, wherein selecting a subset of pixel values in each column that correspond to the geographic distance includes selecting fewer pixels from columns further away from a column of pixels of the first image scan corresponding to nadir than in a column of the first image scan closer to nadir.

4. The method of claim 3, wherein selecting the subset of pixel values in each column includes selecting all pixels in the column of the first image scan corresponding to nadir.

5. The method of claim 3, wherein selecting the subset of pixel values in each column includes selecting pixel values based on a polynomial that approximates a number of pixels to be selected as a function of a distance, in terms of number of columns of pixels, from nadir.

6. The method of claim 5, wherein the polynomial is a piecewise polynomial.

7. The method of claim 1, further comprising situating, on a display, the modified first image scan contiguous with the second image scan, the modified first and second image scans providing a view that comports with actual geo-spatial orientation and shape of objects in the first and second image scans.

8. The method of claim 1, further comprising, providing an image comprising the modified first image scan and the modified second image scan contiguous with each other to a machine learning (ML) model.

9. The method of claim 1, wherein upsampling the first and second image scans and interpolating the upsampled pixel values includes using a matrix interpolant per column such that a matrix interpolant used on a specific column of a first image scan as the matrix interpolant as a corresponding column of the second image scan.

10. A non-transitory machine-readable medium including instructions that, when executed by a machine, cause the machine to perform operations for processing visible infrared imaging radiometer suite (VIIRS) scans, the operations comprising:
receiving image data of immediately adjacent VIIRS image scans including a first image scan and a second image scan, the first image scan and the second image scan providing a partially overlapping view of a geographic area;
resampling columns of pixels of the first image scan and the second image scan including:
selecting, in the first image scan and the second image scan, a subset of pixel values in each column that correspond to a geographic distance between (i) a point viewed in a center of a column in the first image scan and (ii) a point viewed in a center of a corresponding column in the second image scan;
upsampling the selected pixels to an equal number of pixels in each column resulting in upsampled pixel values; and
interpolating the upsampled pixel values to produce modified first and second image scans.

11. The non-transitory machine-readable medium of claim 10, wherein the geographic distance is a geographic distance viewed in a column of pixels of the first image scan corresponding to nadir.

12. The non-transitory machine-readable medium of claim 10, wherein selecting a subset of pixel values in each column that correspond to the geographic distance includes selecting fewer pixels from columns further away from a column of pixels of the first image scan corresponding to nadir than in a column of the first image scan closer to nadir.

13. The non-transitory machine-readable medium of claim 12, wherein selecting the subset of pixel values in each column includes selecting all pixels in the column of the first image scan corresponding to nadir.

14. The non-transitory machine-readable medium of claim 12, wherein selecting the subset of pixel values in each column includes selecting pixel values based on a polynomial that approximates a number of pixels to be selected as a function of a distance, in terms of number of columns of pixels, from nadir.

15. The non-transitory machine-readable medium of claim 14, wherein the polynomial is a piecewise polynomial.

16. A system comprising:
processing circuitry; and
a memory coupled to the processing circuitry, the memory including instructions that, when executed by the processing circuitry, cause the processing circuitry to perform operations for processing visible infrared imaging radiometer suite (VIIRS) scans, the operations comprising:
  receiving image data of immediately adjacent VIIRS image scans including a first image scan and a second image scan, the first image scan and the second image scan providing a partially overlapping view of a geographic area;
  resampling columns of pixels of the first image scan and the second image scan including:
    selecting, in the first image scan and the second image scan, a subset of pixel values in each column that correspond to a geographic distance between (i) a point viewed in a center of a column in the first image scan and (ii) a point viewed in a center of a corresponding column in the second image scan;
    upsampling the selected pixels to an equal number of pixels in each column resulting in upsampled pixel values; and
    interpolating the upsampled pixel values to produce modified first and second image scans.

17. The system of claim 16, further comprising:
a display device coupled to the processing circuitry, and the operations further comprise causing the display device to provide a view of the modified first image scan contiguous with the second image scan, the modified first and second image scans providing a view that comports with actual geo-spatial orientation and shape of objects in the first and second image scans.

18. The system of claim 16, wherein the operations further comprise, providing an image comprising the modified first image scan and the modified second image scan contiguous with each other to a machine learning (ML) model.

19. The system of claim 16, wherein upsampling the first and second image scans and interpolating the upsampled pixel values includes using a matrix interpolant per column such that a matrix interpolant used on a specific column of a first image scan as the matrix interpolant as a corresponding column of the second image scan.

20. The system of claim 16, wherein selecting the subset of pixel values in each column includes selecting pixel values based on a polynomial that approximates a number of pixels to be selected as a function of a distance, in terms of number of columns of pixels, from nadir.

* * * * *